July 20, 1937.   C. C. HUTCHINS   2,087,406

DYNAMO-ELECTRIC MACHINE

Filed Sept. 23, 1935

INVENTOR
Charles C. Hutchins
by his attorneys
Byrnes, Stebbins & Blenko

Patented July 20, 1937

2,087,406

UNITED STATES PATENT OFFICE 2,087,406

DYNAMO-ELECTRIC MACHINE

Charles C. Hutchins, Ridgway, Pa., assignor to Elliott Company, Pittsburgh, Pa., a corporation of Pennsylvania Application September 23, 1935, Serial No. 41,742

4 Claims. (Cl. 172—120)

This invention relates generally to dynamo-electric machines and, in particular, to short-circuited windings therefor, such as are utilized in induction motor rotors, or amortisseur or damper windings disposed in the fields or armatures of motors and generators.

Short-circuited and damper windings have heretofore been constructed by inserting conductor bars of square, round or rectangular section in slots formed in the rotor of an induction motor or the field or armature of a motor or generator, the slots being either open or closed. It is desirable in such construction to dispose the conductors as near the periphery of the field or armature core as possible, yet a certain thickness of core lamination must be maintained outwardly of the inductor in rotating armatures or fields to withstand the centrifugal force which tends to throw the conductors out of the slots. The space factor of the usual winding of this character, furthermore, is not good, since it requires a deeper slot for the reception of bar windings than is desirable, especially in cases where two rows of conductors, one above the other, are required. It is necessary to allow a certain clearance between the slots and the conductors to permit the insertion of the latter. This causes the machine to emit a noise or rattle during starting because of the relative looseness of the bars in the slots. Because of the looseness of the bars, furthermore, the whole winding, including bars and the short-circuiting end rings to which they are connected, is subject to axial movement relative to the core.

I have invented a short-circuited or damper winding and method of making it which successfully overcomes the aforementioned objections to previous windings of this type and is characterized by further novel features and advantages which will become apparent as the description thereof proceeds. In accordance with my invention, I employ conductor bars of polygonal section and form the slots in the arcuate core members in which they are disposed so that when inserted therein the conductors have their faces at oblique angles to the plane passing through the axis of curvature of the arcuate core member and the axis of the particular conductor bar. In a preferred form, I use bars having a substantially square section and form the slots in which they are disposed so that diagonally opposite edges of the bars lie in the plane containing the axis of the machine and the axis of the bar. After inserting the bars in the slots, I give them a partial twist. This tends to fix the bars in the core member and also facilitates connection thereto of the end rings.

In the case of small dynamo-electrical machinery, clattering has been eliminated by casting the conductor bars within the core or pole pieces. However, a cast core or pole member is not as efficient electrically as a wrought member, and those skilled in the art have not been able to successfully provide electrical machines of cast construction where the larger sizes, such as are commonly employed, are to be manufactured.

In accordance with the principles of my invention, I provide a conductor bar which is necessarily somewhat smaller than the slots which extend through the core or pole member and which has an outline complementary with the slot. This outline or shape is such that the bar is automatically wedged into position during rotation of the member. The means for accomplishing the wedging action is preferably positioned substantially in the direction of a major force set up during the rotation of the member. Although this broad idea makes it possible to eliminate most of the clattering, I contemplate providing a plurality of wedge-like portions extending oppositely with respect to each other and having a dihedral angle-like outline. As a result, I am able to effectively wedge a given bar in position within its associated core or pole member irrespective of the direction or speed of rotation of the member or of the torque applied thereto.

For a complete understanding of the invention, reference is made to the accompanying drawing illustrating several possible embodiments, although the invention is not limited to those shown and may be otherwise embodied within the scope of my broader claims. In the drawing:

Figure 1:
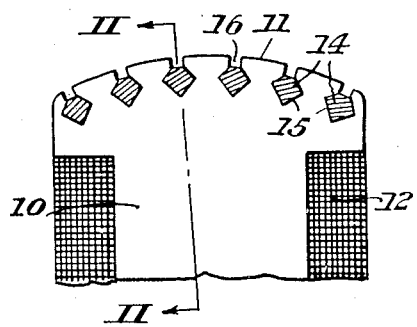
Figure 1 is a partial sectional view taken through a field pole of a rotating armature at right angles to the axis of the machine of which it forms a part, such as a synchronous alternator.

Referring now in detail to the drawing, a pole 10, such as that of a rotating field alternator or motor, has an arcuate face 11, the curvature of which conforms generally to that of the field or stator within which the pole is mounted for rotation. The pole 10 is provided with a winding 12 coaxial with the pole itself, and a pole face winding comprising conductors 14 embedded in slots 15 formed in the pole face. The pole 10 is formed of stacked laminations, each lamination having recesses punched therein which, when the laminations are stacked, form the slots 15. In the specific form of the invention shown in Figure 1, the conductors 14 are substantially square in section and the slots 15 are similarly formed. The slots are open, that is to say, they are connected to the periphery of the pole by slots 16 with parallel sides. As clearly shown in Figures 1 through 3, the slots 15 are disposed so that the planes defining the boundaries thereof are at oblique angles to planes determined by the axis of the machine and the axes of the slots. Specifically, the plane bisecting the angle between adjacent sides of the slots is substantially radial relative to the machine. The same is true of planes passed diagonally through the several conductor bars.

As seen from the figures, each conductor bar has a substantially symmetrical square outline such that at least three and preferably four substantially dihedral angle or wedge-like corner portions are provided. As shown, these corner portions are positioned to point in the direction of forces set up at the beginning of the rotation of the core or pole member, during its rotation, and when it is being accelerated, decelerated, and stopped. More particularly, at least two dihedral angle portions formed by substantially equal length side portions are positioned in an opposite relationship with respect to each other and point arcuately of the core or pole member in such a manner that these two dihedral angle portions of each bar lie in substantially the same arcuate plane as the dihedral angle portions of other bars of the same row, see, for example, Figure 1. These portions take care of stopping and starting, and accelerating and decelerating forces. At least one other dihedral angle portion points substantially radially of the core or pole member toward the axis of such member. This dihedral angle portion together with the previously-mentioned two opposite dihedral angle portions lock the bar against centripetal as well as centrifugal forces set up during the rotation of the member. Of course, the same is true of the upper substantially dihedral angle portion which points radially toward the periphery of the member. I have thus provided a core or pole construction that is rattle-proof and is remarkably efficient in operation.

Figure 4:
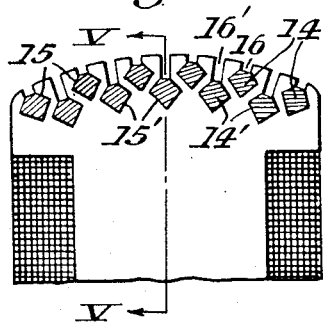
Figure 4 is a view similar to Figure 1 showing a further form of the invention.
Figure 6:
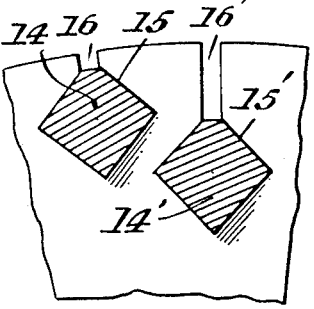
Figure 6 is a view similar to Figure 4 showing a portion thereof to enlarged scale.

It will also appear that each of the bars or the slots in which the bars of one row are positioned have at least two sides which are substantially parallel with respect to at least one side of at least two other adjacent and spaced bars or slots of another row (see Figures 4 and 6). The shape of the bars makes possible an effective non-clattering action and also makes possible a new and more efficient and novel arrangement of such bars with respect to the pole member and with respect to the bars of an adjacent row of bars.

Figure 2:
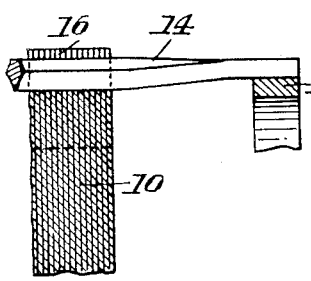
Figure 2 is a partial sectional view along the line II—II of Figure 1.

The conductors 14 are preferably flattened at the corner which would otherwise project into the slots 16. The conductors 14, furthermore, are given a partial twist, as shown in Figure 2, after being inserted into the pole. This has the effect of locking the bars against axial movement relative to the pole. It also facilitates connection of the conductors 14 to end rings 17 by brazing, soldering, or the like.

Figure 3:
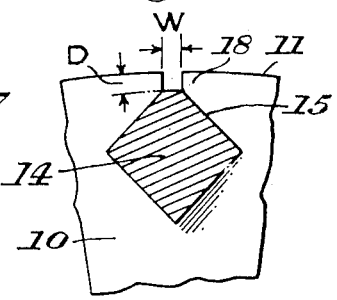
Figure 3 is a partial section similar to Figure 1 to enlarged scale.

As shown in Figure 3, the length of the slot 16, indicated by the dimension D, can be made very small because the overhanging tooth tip 18 increases rapidly in depth along the direction from one side of the slot 16, thus furnishing ample metal section to withstand the centrifugal force to which the conductors are subject in operation of the machine. This is of further advantage because of the fact that the permeance of the slot is proportional to the ratio of the dimension D to the width W of the slot 16. The leakage permeance can thus be reduced materially by my invention, as compared to machines previously known, without sacrificing the mechanical strength necessary to withstand the centrifugal force on the conductors.

Another advantage of the construction shown in Figures 1 to 3 is that the effect of centrifugal force is to wedge the conductors tightly against the outer sides of the slots and thus prevent any lost motion or rattling of the conductors in the slots during starting or normal operation.

Figure 5:
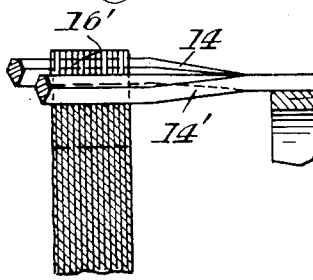
Figure 5 is a sectional view taken along the line V—V of Figure 4.

Figures 4 through 6 correspond to Figures 1 through 3 but show a double row winding including conductors 14' disposed in slots 15'. The slots 15' are disposed inwardly of and between the slots 15 and are connected to the periphery of the pole face by slots 16'. The conductors 14 and 14' of both inner and outer rows can be connected to the same end ring 17'. By this arrangement, it is possible to employ a large number of conductors in a given peripheral length of pole face, and at the same time provide ample mechanical strength, since the section of material effective to withstand centrifugal force on the bars increases rapidly with the distance from the slots 16 and 16'.

In an electrical machine, for example one of the synchronous type, there are two primary considerations which govern the employment of a desired number of conductor bars such as short circuiting bars. As previously pointed out, one of these considerations is the provision of a sufficient length of pole piece between the ampere turns (IN), see for example Figure 4. The distance between the top of the winding shown and the top of the peripheral surface of the pole piece must thus be sufficiently great to provide the necessary mechanical strength for resisting the stresses, particularly those set up by the centrifugal forces which would tend to throw the conductor bars out of their slots and to spread the teeth portions. However, the second consideration limits the first. This second consideration commonly called the flux leakage, is the leakage which occurs between the top of the coil or ampere turns and the peripheral surface of the pole and escapes from the sides of the length of the pole across the air gap between poles to an adjacent pole.

If the length of the pole above the ampere turns is too great, this flux leakage will diminish the effective flux, and in fact make it useless.

Previous to the present invention, those skilled in the art have not been able to provide a practical and effective form of machine such as a slow speed synchronous motor of the larger type having more than a single row of conductors by reason of this flux leakage and its limiting effect upon the necessary mechanical strength of the pole pieces. By providing a substantially square (angularly symmetrical) type of conductor bars and bars and slots of substantially symmetrical shape, by uniformly spacing one or more rows of such bars, and staggering the rows, I have been able to successfully meet the above problems. And further, I have been able to so position each conductor bar that the ratio of $$\frac{D}{W}$$

is maintained sufficiently low that the leakage permanence will be prevented from so nullifying the effective action of the working flux that the machine will be inoperative. That is, I have been the first to successfully employ a double row of conductors which may be effectively employed in connection with a slow speed dynamo-electrical machine such as a synchronous motor.

Figure 7:
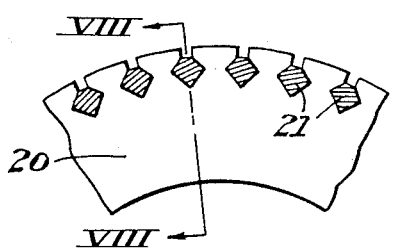
Figure 7 is a view similar to Figure 1 showing the invention applied to the rotor of an induction motor.
Figure 8:
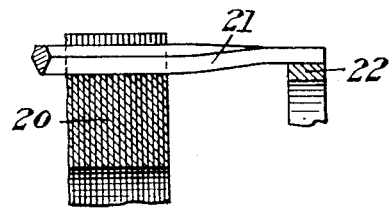
Figure 8 is a partial sectional view along the line VIII—VIII of Figure 7.
Figure 9:
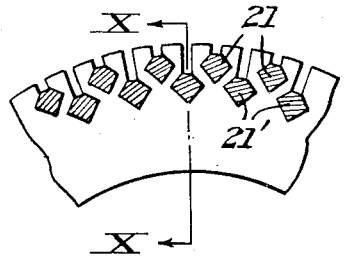
Figure 9 is a view similar to Figure 7 showing a further form of the invention.
Figure 10:
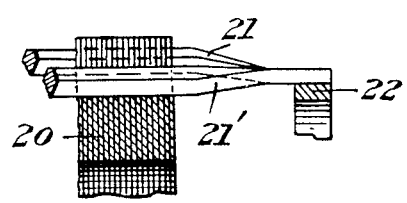
Figure 10 is a sectional view along the line X—X of Figure 9.

Figures 7 and 8 show the invention applied to an induction motor rotor. The rotor core is indicated at 20 and bars 21 embedded therein form a squirrel cage winding, the ends of the bars being connected by end rings 22. The arrangement of the slots and conductors relative to the arcuate periphery of the rotor core 21 is similar to that of the pole face winding formed by the bars 14 and the end rings 17, as shown in Figures 1 through 6. Figures 9 and 10 show a squirrel cage rotor having two rows of conductor bars 21 and 21'.

It will be apparent that the invention provides a novel and highly advantageous short-circuited or damper winding for dynamo-electric machines. While the invention has been disclosed as applied particularly to damper windings for synchronous machines and short-circuited windings for induction motors, it is obvious that it may be applied to all types of machines where squirrel cage, damper or amortisseur windings are desired. The advantages of the construction shown have been pointed out in the foregoing description and further emphasis thereupon would be superfluous.

While I have disclosed herein only a few of the possible forms of the invention, it may be applied in other forms and methods without departing from the spirit thereof or the scope of the appended claims.

I claim:

1. In a core or pole member for electrical machinery, at least one substantially symmetrical conductor bar positioned to extend through said member adjacent a periphery thereof, said conductor bar having a plurality of angle portions, at least two of said angle portions extending in an arcuate plane arcuately of said member, and the bisector of at least one other of said angle portions extending substantially radially of said member, said last-mentioned angle portion pointing in a direction opposite to such adjacent periphery.

2. In a core or pole member for electrical machinery, a plurality of conductor bars extending through said member adjacent a periphery thereof, each of said conductor bars having four-substantially-equal sides, each of said conductor bars having at least three dihedral angle portions formed by said sides, at least two-opposite-dihedral angle portions of each of said bars pointing arcuately of said member in substantially the same arcuate plane, said other dihedral angle portion pointing substantially radially of said member.

3. In a rotatable core or pole member for electrical machinery, a row of substantially uniformly-spaced slots extending through said member adjacent a periphery thereof and opening to the periphery thereof, a second row of substantially uniformly-spaced slots extending through said member and opening to the periphery thereof, said second row of slots being substantially uniformly-spaced with respect to the slots of said first-mentioned row and having a staggered relationship with respect to the slots of said first-mentioned row, each of said slots having at least two sides at oblique angles to an arcuate plane through said core member and in a substantially parallel relationship with respect to at least one side of at least two other adjacent and spaced slots, each of said slots being substantially symmetrical in outline and having at least four-substantially-equal planar sides forming at least three dihedral angle corners, a plurality of substantially symmetrical conductor bars positioned in the slots of said rows and extending through said member, and each of said conductor bars being substantially complementary with respect to the slot within which it is positioned.

4. In a core or pole member for electrical machinery, at least one conductor bar arranged to extend through said member adjacent a periphery thereof, said conductor bar having a plurality of angle portions, at least two of said angle portions extending in an arcuate plane arcuately of said member, and the bisector of at least one other of said angle portions extending substantially radially of said member, said last-mentioned angle portion pointing in a direction opposite to such adjacent periphery.

CHARLES C. HUTCHINS.